UNITED STATES PATENT OFFICE.

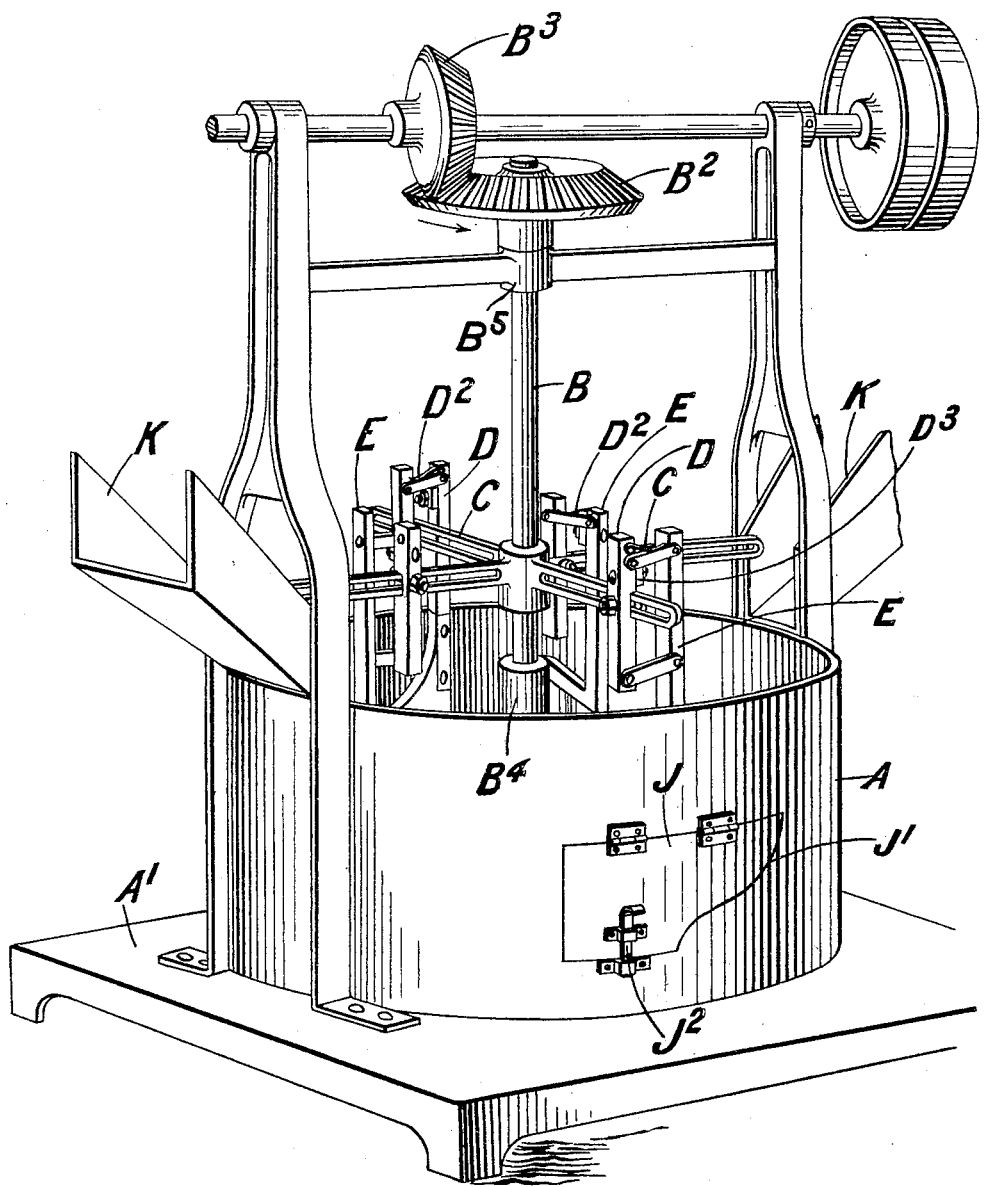

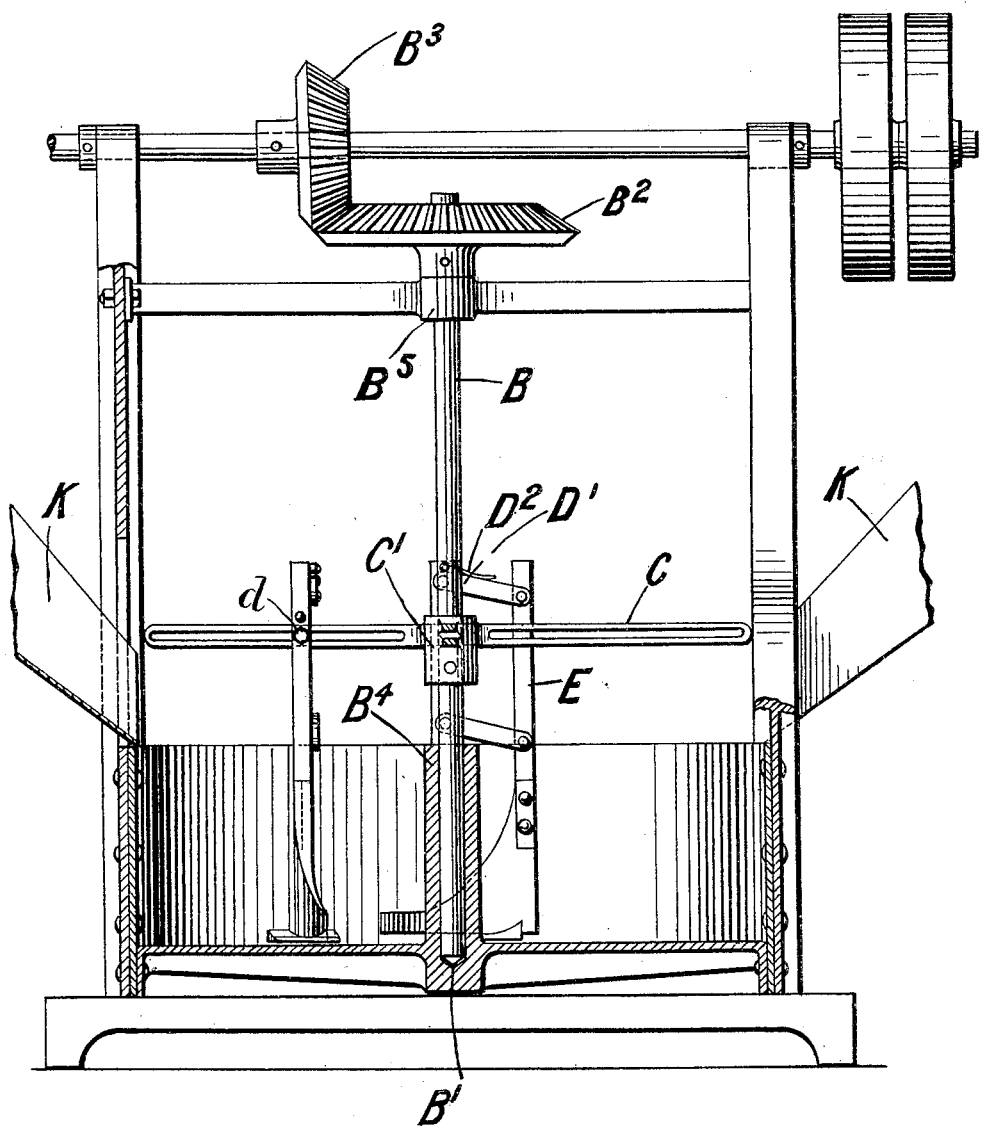

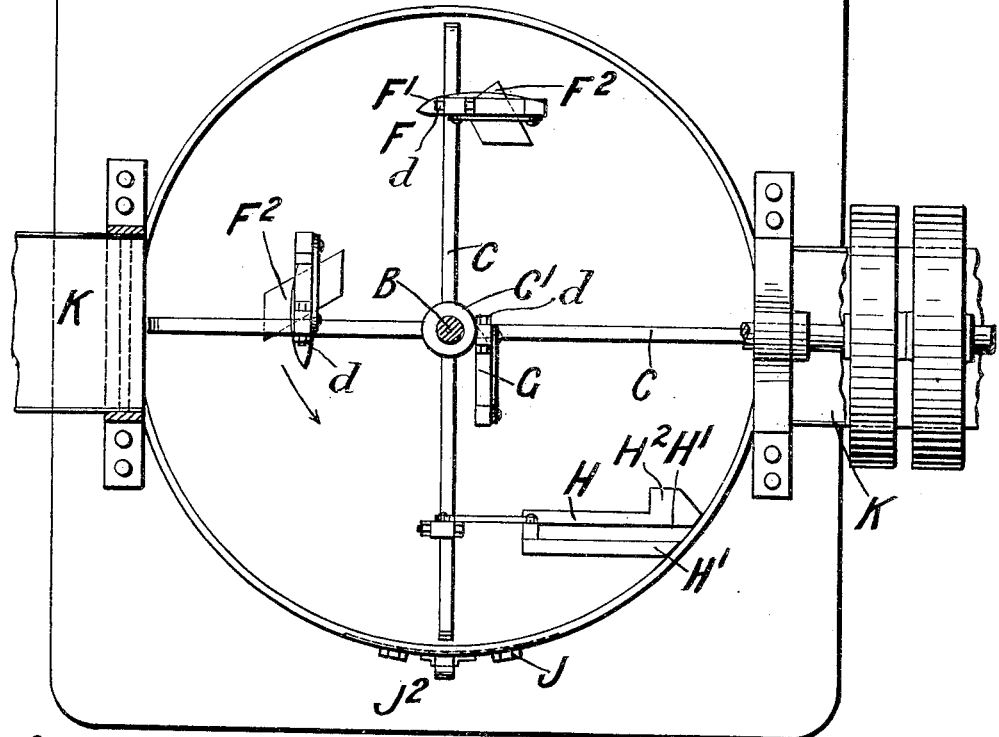
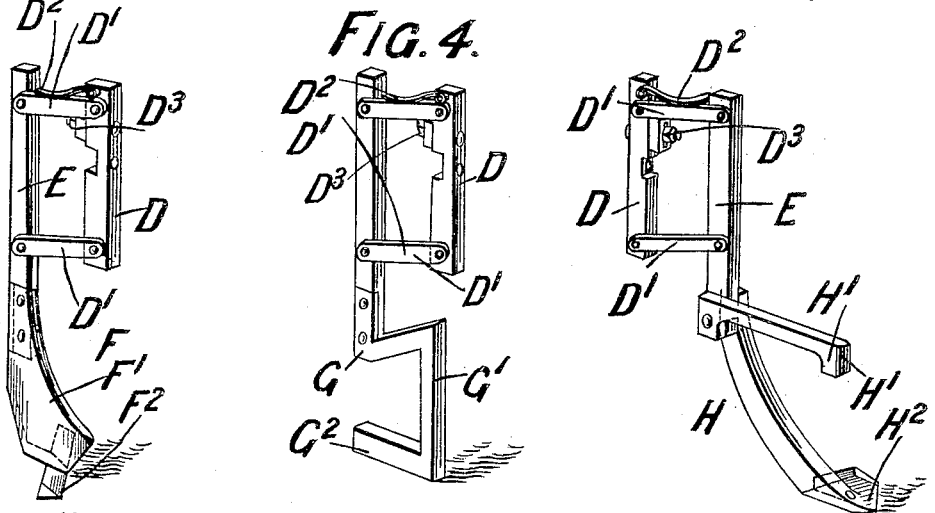

CHARLES WHALLEY, OF BLACKPOOL, ENGLAND.

MIXING-MACHINE.

No. 920,703.  Specification of Letters Patent.  Patented May 4, 1909.

Application filed June 30, 1908. Serial No. 441,264.

*To all whom it may concern:*

Be it known that I, CHARLES WHALLEY, a subject of the King of England, residing at Blackpool, county of Lancaster, England, have invented certain new and useful Improvements in Mixing-Machines, of which the following is a specification.

This invention relates to mixing machines more particularly those adapted for use in the preparation of concrete, asphalt, mortar and the like.

The object of this invention is to provide a machine whereby the stones, cement and water or other materials can be quickly mixed at one operation without any risk of the contents jamming or clogging and can be discharged by a continued rotation of the stirring members.

According to this invention the stirring members are adjustably mounted on arms which radiate from a rotating shaft, each stirring member comprising a vertical cutting portion and a scraping portion which is normally almost in contact with the bottom of the pan. The stirring members, of which there may be any suitable number, are so relatively positioned that the areas over which the scraping portions operate overlap each other: thus the material over the whole bottom surface of the pan is thoroughly agitated in one complete revolution of the shaft. The stirring member nearest the rotating shaft is preferably so arranged that its vertical cutting edge is always in contact or almost in contact with the shaft or its protective sleeve and the edge of the stirrer nearest the circumference of the pan is similarly disposed so that it scrapes the inner peripheral wall thereof. The stirring members are so disposed that they tend to force the contents of the pan toward the circumference of the latter so that when mixing has been completed a door in the peripheral wall of the pan is opened and the mixture discharged by the continued rotation of the shaft, the pan being thus rendered free to receive a further charge.

In the accompanying drawings which show one form of apparatus according to this invention, Figure 1 is a perspective view of the complete pan, Fig. 2 is a side elevation partly in section one of the stirring arms being omitted for the sake of clearness. Fig. 3 is a plan and Fig. 4 shows three forms of stirring members in perspective.

A fixed circular pan or mixing vessel A of known construction is supported on some suitable base such as A' which may be on wheels if desired and has mounted on its center a rotatable vertical shaft B the lower end of which works in bearings B' formed on the underside of the pan A so as to be out of the way of grit. The upper end of the shaft is carried in a suitable bearing $B^5$ and provided with a bevel pinion $B^2$ meshing with another bevel pinion $B^3$ on a driving shaft or adapted to receive rotary motion in some other convenient manner. That portion of the shaft B which is within the pan A is protected by a sleeve or collar $B^4$ the height of which preferably corresponds to that of the pan to which it is rigidly attached. Carried by the shaft B are a number of arms C which radiate from a collar or sleeve C' which is vertically adjustable on the shaft B. The number of arms may vary to suit requirements and in the construction illustrated four of such arms are shown. Each arm C carries a vertical member D, which may be rigidly secured thereon in any desired position of radial adjustment, conveniently by means of a bolt $d$, shown in Figs. 1 and 2. Connected to said vertical members D by means of parallel links D' are vertical members E on the lower ends of which are detachably mounted the stirring members F, G, H.

Each stirring member comprises a cutting portion and a scraping portion the latter being normally maintained just out of contact with the bottom surface of the pan by springs $D^2$ which are attached to said members D so as to normally press the upper links D', downwardly against the stops $D^3$, which comprise blocks having vertical slots through which pass bolts whereby the blocks may be rigidly secured upon the members D in any desired position of vertical adjustment to determine the vertical position of said scrapers as best shown at the right hand side of Fig. 4.

The stirring members are so relatively positioned that in one complete revolution of the shaft B the whole of the bottom surface of the pan is covered, the areas over which the scraping portions operate overlapping each other. Preferably the stirring member nearest the rotating shaft C, that is to say the scraping member G is so disposed that its cutting edge G' is almost in contact with a sleeve $B^4$ during one complete revolution, its scraping surface $G^2$ being almost in contact with the bottom surface of the pan. Similarly the cutting portions H' of the stirring member H nearest the circumference of the pan remain almost in contact with the inner peripheral wall of the latter throughout the revolution of the shaft, the scraping surface $H^2$ having a flat under surface and wedge shaped toe being maintained just out of contact with the bottom of the pan.

The remaining two stirring members F each comprise a cutting portion F′ which is bent to form substantially an arc of the circle in which it rotates, and scraping portions $F^2$, these being in the form of wedge shaped projections on either side of the cutting portion F′, having flat under surfaces.

Owing to the employment of parallel links D′ should a stone or other hard particle come between a scraping surface and the bottom of the pan the vertical rods E on which the stirring members as a whole are mounted will at once be lifted against the action of its depressing spring $D^2$ and thus made to clear the obstruction.

The stirring members are preferably so arranged that in the case of the outermost stirring member H the vertical rod E is in advance of the member D to which it is attached by the parallel links D′. The remaining stirring members are preferably arranged so that they are behind the vertical members D to which they are connected by their parallel links D′ although the innermost member may if desired be mounted in a manner similar to the outermost member. This particular disposition of the blade carrying members E is useful as regards the movement that the blades will have when they are lifted the disposition and angles which the parallel links D′ make with the fixed members D and movable members E causing the stirring member when it meets with an obstruction to rise and either move backward or upward and slightly forward according to the disposition of the parts.

At some convenient point in the peripheral wall of the pan A an opening is formed normally closed by a door J, the door being flanged in such a manner that when it is closed the inner peripheral wall of the flange presents a perfectly even surface. The discharge aperture is preferably of the peculiar shape shown that is to say that portion of it through which discharge of the contents first takes place is formed comparatively wide and provided with a straight base, this base being approximately on a level with and parallel to the bottom of the pan. The lower edge however after a short distance rises in a sharp curve to form a shoulder which is closed by the correspondingly shaped portion J′ of the door, the object of this shoulder being to prevent jamming which may take place at this point of the discharge. The door is provided with a bolt $J^2$ or other device to maintain it in its closed position.

It will be understood that in some cases the weight of the stirring members is of itself sufficient to maintain the scraping portions in their correct normal position, that is to say just out of contact with the bottom of the pan, so that the springs $D^2$ need not always be employed.

In working the apparatus the materials to be mixed are fed into the pan preferably by means of hoppers or chutes K or in some other suitable manner and the shaft B is then set in motion whereupon the whole mass is turned over bit by bit and thoroughly mixed, a suitable proportion of water being added when necessary which will quickly be distributed throughout the whole mass. On the discharge door J being opened and the rotation of the shaft B continued the machine at once begins to discharge its contents and in a short time it will be found absolutely clear and ready for a further charge.

It will be understood that although the machine has been particularly described for use in connection with the manufacture of concrete it is equally applicable for mixing cattle or other foods. Further the details of construction may be varied and the several stirring members interchanged or replaced by other stirring members having similar characteristics if desired without departing from this invention.

What I claim as my invention and desire to secure by Letters Patent is:—

1. In a mixing machine the combination of a pan, a shaft having arms radiating therefrom, vertical members mounted on said arms, stirring members connected to said vertical members by pivoted parallel links, each stirring member having a cutting portion and a scraping portion, the stirring members being so relatively positioned that the areas over which the scraping portions operate overlap each other, the peripheral wall of the pan having a discharge aperture closed by a door and means for producing relative rotary motion between the shaft and pan as set forth.

2. In a mixing machine the combination of a pan, a shaft having arms radiating therefrom, vertical members mounted on the said arms, stirring members connected to said vertical members by pivoted parallel links, each stirring member having a cutting portion and a scraping portion, the stirring members being so relatively positioned that the areas over which the scraping portions operate overlap each other, the peripheral wall of the pan having a discharge aperture closed by a door, such aperture having one of its edges inclined to facilitate the egress of the mixed material without jamming and means for producing relative rotary motion between the shaft and pan as set forth.

3. In a mixing machine the combination of a pan having a discharge aperture in its peripheral wall, a door arranged to close said aperture, a shaft having arms radiating therefrom, vertical members mounted on said arms and adjustable thereon, stirring members connected to said vertical members by pivoted parallel links, each stirring member having a cutting portion and a scraping portion, the stirring members being so relatively positioned that the areas over which the scraping portions operate overlap each other, and means for producing relative rotary movement between the shaft and pan as set forth.

4. In a mixing machine the combination of a pan, a shaft having arms radiating therefrom, vertical members mounted on said arms, vertical blade carrying members connected by pivoted parallel links to the first mentioned vertical members, stirring members detachably mounted on said blade carrying members each having a cutting portion and a scraping portion, and means for producing relative rotary movement between the shaft and pan as set forth.

5. In a mixing machine the combination of a pan, a shaft having arms radiating therefrom, vertical members mounted on said arms, vertical blade carrying members connected by pivoted parallel links to the first mentioned vertical members, stirring members detachably mounted on said blade carrying members each having a cutting portion and a scraping portion, the stirring members being so relatively positioned that the areas over which the scraping portions operate overlap each other, and means for producing relative rotary motion between the shaft and pan as set forth.

6. In a mixing machine the combination of a pan, a shaft having arms radiating therefrom, vertical members mounted on said arms, vertical blade carrying members connected by pivoted parallel links to the first mentioned vertical members, stirring members detachably mounted on said blade carrying members each having a cutting portion and a scraping portion, means whereby each scraping portion is normally held just out of contact with the bottom of the pan, the stirring members being so relatively positioned that the areas over which the scraping portions operate overlap each other, and means for producing relative rotary motion between the shaft and pan as set forth.

7. In a mixing machine the combination of a pan, a shaft having arms radiating therefrom and adjustable thereon, vertical members mounted on said arms and adjustable radially thereon, blade carrying vertical members connected by pivoted parallel links to the first mentioned vertical members, stirring members detachably mounted on said blade carrying vertical members each having a cutting portion and a scraping portion, the stirring members being so relatively positioned that the areas over which the scraping portions operate overlap each other, springs coöperating with adjustable stops on the vertical members tending to keep said scraping portions just out of contact with the bottom of the pan, and means for rotating the shaft relatively to the pan as set forth.

In testimony whereof I have signed my name to this specification in the presence of two subscribing witnesses.

CHARLES WHALLEY.

Witnesses:
W. T. HUYSLIN,
JNO. LUCAS.